UNITED STATES PATENT OFFICE.

JACOB S. ROBESON, OF AU SABLE FORKS, NEW YORK.

PROCESS OF MAKING ROADS.

1,075,857.                Specification of Letters Patent.    Patented Oct. 14, 1913.

No Drawing. Application filed March 6, 1912, Serial No. 682,013. Renewed July 23, 1913. Serial No. 780,815.

*To all whom it may concern:*

Be it known that I, JACOB S. ROBESON, a citizen of the United States, residing at Au Sable Forks, in the county of Essex and State of New York, have invented certain new and useful Improvements in Processes of Making Roads, of which the following is a specification.

This invention relates to processes of making roads; and it comprises a process wherein roads made of, or containing clay, such as dirt and loam, or of materials yielding clay, such as the igneous and granitic rocks containing feldspathic and feldspathoid minerals and used for macadamizing, such as granite, gneiss, trap, etc., as well as artificial silicates such as slag, are treated first with saline bodies, and advantageously with non-hygroscopic saline bodies, such as common salt, to produce chemical changes in the clay-like colloids and in the complex silicates of such rocks, and are thereafter treated with a waste sulfite liquor preparation; all as hereinafter described and as claimed.

Clay contains very finely divided mineral particles of a more or less colloid character and has in itself comparatively little binding power which is useful under traffic conditions. On wetting it becomes mud and on drying it becomes cloddy; but the clods or hardened masses break down under traffic conditions into the original very finely divided particles, with the result of forming dust. The complex silicates of igneous and granitic rocks, containing or composed of feldspathic and feldspathoid minerals, such as feldspar, granite, gneiss, leucite, trap, syenite, rhyolite, etc., on weathering break down more or less, forming among other things clay (kaolin) and alkali silicates, the complex silicates of such rocks containing alumina and more or less of the alkalis. In so far as the clay so formed is concerned, it is like ordinary clay, but its binding power in a road is somewhat better, probably because of the formation and presence of the alkali compounds such as the silicates. This weathering action however is very slow. Ordinary clays and the soil of "dirt roads" also contain fine particles of these complex silicates, feldspar being a particularly common component.

I have found that clay may be changed in physical character by a treatment with waste sulfite preparations, which cause it to become converted into a hard, compact and dense form, resisting traffic well without forming mud or dust. And the sulfite waste liquor itself is in turn converted into a form resistant to water as it does not leach out with rain. On feldspathic and feldspathoid minerals, waste sulfite liquor produces a specific action accelerating the breaking down or "weathering" and clay production and changing the character of the products of breaking down in an advantageous way. Road-making processes involving these discoveries are described and claimed in my copending applications 463,709 and 611,163.

Sulfite liquor is the watery waste product from the manufacture of sulfite paper pulp in which wood is heated under pressure with solutions of bisulfites, such as bisulfite of calcium or a mixture of bisulfites of lime and magnesia, dolomitic lime being often used in its preparation. In the pulp-making process about one-half the wood, or the part called "lignone," goes into solution to form new organic sulfur-containing complexes united with the bases present. These complexes appear to be, at least in part, in the nature of sulfonic acids and for the sake of a name the soluble matters are generally called lignosulfonates of the bases present. This term being convenient, it will be used hereinafter. In its original state, the waste liquor is a dilute liquid containing the lignosulfonates in such a condition that their valuable properties are not readily available for most purposes. By neutralizing carefully and evaporating at a low temperature, the dilute liquor can be converted into a new, more stable form of much more colloid, adhesive and advantageous properties. Treatment in this way is described in my Patent 833,634.

I have discovered that an advantageous type of roadway may be made by treating roads, made of, or comprising, clay or clay-yielding materials, such as described, preliminarily with a salt to cause chemical and physical changes therein, and then further treating the roads with waste sulfite liquor preparations. The salt may be applied in a dissolved state, as a solution or brine; or in the solid state. The salt in the present invention exercises an action which places the road-forming materials in a better condition for the subsequent action of the lignosulfonates. Common salt, or sodium chlorid, is the best substance to use in this first step, as it has little hygroscopic power and has good chemical properties for the present purposes, as well as being cheap. One action of the salt is to change the physical character of the clay in some way, this being possibly due to the general action of saline bodies on colloid bodies, since clay always contains colloid mineral matters. This action *per se* upon clay for road-making purposes is not advantageous, since the clay, though not forming as sticky a mud as before, dusts freely on drying. It does however have an advantage for the present purposes in that it makes the clay more reactive with the sulfite liquor to be applied subsequently. An addition of salt to the waste liquor itself changes it detrimentally, because of the stated action of salt on the colloids, and it is therefore not desirable to apply the salt and the lignosulfonate simultaneously. The salt should be allowed to exercise its action first. In the present process therefore the salt is applied to the road first and the road is then allowed to lie for one or more days to permit the action of the salt upon the clay prior to the application of the sulfite liquor. Upon feldspathic and feldspathoid minerals, as well as rocks containing them, salt acts in facilitating and accelerating the breaking down to form clay, alkali silicates, etc. In these actions upon clay and rock, salt requires the presence of moisture. After the application therefore in dry weather, the road should be sprinkled or otherwise moistened to allow the salt to react. After treating a dirt road, or a road macadamized with the described rocks, with the salt and moisture, and allowing the salt to act, the road should thereafter be treated with sulfite liquor. The neutral concentrated liquor of my Patent 833,634 may be used advantageously. The raw or crude liquor as it comes from the digester is less advantageous both because less active for the present purposes and because of its dilution. The liquor which may be obtained as a residue from the alcoholic fermentation of waste sulfite liquor is also of improved value for the present purposes, since its contained soluble matter is richer in colloidal lignosulfonates than is that of ordinary sulfite liquor, by reason of the removal of some carbohydrates during the fermentation. After removal of the alcohol and suitable concentration, this residual liquor is especially adapted for use with road materials in the present manner. To quicken the results, an acid-reacting preparation may be applied, but unless the weather be rainy, the speed of action of the neutral liquid is often sufficient. Sulfite liquor having an acid reaction quickly produces the action desired in the present invention. The acidity may be that naturally present in the sulfite liquor coming from the digesters; *i. e.*, due to free sulfurous-acid or bisulfite. Owing however to the less advantageous properties of the raw sulfite liquor, when an acid-reacting liquid is required it is better to make a preparation from the concentrated liquor, produced from the fermented or unfermented liquor, as the case may be. An acid-reacting composition suitable for the present purposes may be made from this liquor by replacing the lime present by a sesquioxid base, such as ferric oxid, chromium oxid or alumina. This may be done by treating the concentrated liquor with a sulfate of a sesquioxid, such as ferric sulfate or alumina sulfate, and removing, if desired, the calcium sulfate formed. The liquor thus produced is desirable for treating roads in and of itself as the sesquioxid bases enhance the colloid properties of the sulfur-containing organic complexes of the sulfite liquor. Its use for treating roads broadly is described in my prior and copending application 463,710. In the present case I shall describe it only as used in conjunction with the preliminary salt treatment of the roadway. A still more advantageous preparation for the present purposes is made by treating concentrated sulfite waste liquor with a mineral acid, preferably sulfuric acid, in such an amount as to set free at least some lignosulfonic acid. Sulfuric acid is best for this purpose, since it produces calcium sulfate which may be separated. In practice I find it sometimes better not to have all the lignosulfonic acid present in free state, but to have some portion of it present in combination with soda. I may therefore advantageously treat the concentrated liquor with sulfate or bisulfate of soda and with sulfuric acid. It is best to use the sulfuric acid first, as concentrated acid otherwise has a tendency to produce local decomposition at the point where it is introduced into the liquor. In a typical embodiment of my invention I may treat concentrated sulfite liquor of 30° B., which is a commercial strength, with sulfuric acid in the proportion of about 2 pounds of acid to 100 pounds of liquor and then with about 3 pounds of bisulfate of soda in solution. The calcium sulfate produced may be allowed to remain, but it is best removed for utilization elsewhere.

In a typical embodiment of my road-making process I may first treat a roadway composed of, or comprising, clay, or clay-yielding materials, such as described, with one pound of salt per square yard, the salt being best applied as a saturated brine. If necessary, the road is then watered and allowed to stand for three days. Thereafter I treat it with sulfite liquor as described in the proportion of one-half gallon of liquor of 30° B., or proportionate amounts of other concentrations, per square yard. The concentrated liquor may be diluted to about 15° B. Roads containing artificial silicates, such as blast furnace slag, may be treated in the same manner as those containing natural silicates.

The lignosulfonates of the sulfite liquor are soluble bodies and are not rendered insoluble by any ordinary chemical treatment. Apparently the lignosulfonates of all the bases are soluble and although they may be salted out of a solution, they remain soluble in most treatments. But for some reason, in forming a road in the manner described the reciprocal action of the clay and of the clay-yielding materials upon the organic matters of the sulfite liquor is such as to make these organic matters insoluble and cause them to remain in the roadway. This has the result of causing a road so made to be permanent even in wet weather. The preliminary action of salt applied to a road in small quantities upon the minerals therein contained, however, hastens this result and not only causes the road to become solid more quickly but, by making the road materials more reactive, lessens the danger of unchanged lignosulfonates being leached out prior to the completion of the action of the clay and minerals thereupon.

After the completion of the action of the sulfite liquor upon roads of the character described, the surface is converted into a hard, compact, coherent, concrete-like mass, little subject to change by traffic or weathering. The surface may be oiled after sufficient time is given for completion of these actions, but oil should not be applied till after the hard surface is obtained, since its presence will interfere with the desired reactions.

What I claim is:—

1. In the treatment of roads and roadways comprising clay or clay-yielding materials, the process which comprises applying salt to such a roadway and thereafter applying a sulfite waste liquor preparation.

2. In the treatment of roads and roadways comprising clay or clay-yielding materials, the process which comprises applying salt to such a roadway and thereafter applying a preparation of concentrated waste sulfite liquor.

3. In the treatment of roads and roadways comprising clay or clay-yielding materials, the process which comprises applying salt to such a roadway and thereafter applying an acid reacting preparation of sulfite waste liquor.

4. In the treatment of roads and roadways comprising clay or clay-yielding materials, the process which comprises applying a salt to such a roadway and thereafter applying an acid reacting preparation of sulfite waste liquor substantially free of carbohydrates.

5. In the treatment of roads and roadways comprising clay or clay-yielding materials, the process which comprises applying a salt to such a roadway and thereafter applying a preparation of concentrated waste sulfite liquor containing free lignosulfonic acids.

6. In the treatment of roads and roadways comprising clay or clay-yielding materials, the process which comprises applying a salt to such a roadway and thereafter applying a preparation of concentrated waste sulfite liquor containing free lignosulfonic acids and a soda base.

7. In the treatment of roads and roadways comprising clay or clay-yielding materials, the process which comprises applying a salt to such a roadway and thereafter applying a preparation of concentrated waste sulfite liquor containing free lignosulfonic acids and a soda base but substantially free of carbohydrates.

In testimony whereof, I affix my signature in the presence of two subscribing witnesses.

JACOB S. ROBESON.

Witnesses:
H. J. LEGGETT,
L. C. BOLLES.